United States Patent

[11] 3,578,776

[72] Inventors Thomas E. Schneider, Jr.;
Marion B. Carstens, Atlanta; Homer J. Bates, Roswell, Ga.
[21] Appl. No. 754,535
[22] Filed Aug. 22, 1968
[45] Patented May 18, 1971
[73] Assignee Tesco Chemicals, Inc.
Atlanta, Ga.
Continuation-in-part of application Ser. No. 579,253, Sept. 14, 1966, now Patent No. 3,057,624, which is a continuation-in-part of application Ser. No. 403,968, Oct. 12, 1964, now Patent No. 3,323,539.

[54] CHEMICAL FEEDER
9 Claims, 5 Drawing Figs.
[52] U.S. Cl. .................................................. 137/268, 23/267, 239/310
[51] Int. Cl. .............................................. B01d 11/02
[50] Field of Search ....................................... 137/268, 426, 563, 101.29, 391; 23/267, 272, 272.8, 267.4 (X), 267.5, 271, 272.6, 311, 309, 312; 239/310 (X), (CO), (Inquired); 4/222—228, 231, 232

[56] References Cited
UNITED STATES PATENTS

| | | | |
|---|---|---|---|
| 1,163,635 | 12/1915 | Baldwin | 23/267.4X |
| 1,245,626 | 11/1917 | Shaffer | 23/267.4X |
| 2,199,844 | 5/1940 | Tucker | 23/267.4X |
| 2,218,790 | 10/1940 | Gifford | 23/267.4X |
| 2,258,063 | 10/1941 | Meyer | 23/272X |
| 2,337,149 | 12/1943 | Bullock | 23/267.4X |
| 2,481,279 | 9/1949 | Barr | 23/267.4UX |
| 2,740,616 | 4/1956 | Walder | 23/272X |
| 3,107,156 | 10/1963 | Fredericks | 23/311X |
| 3,307,914 | 3/1967 | Heiss et al. | 23/312X |
| 3,356,460 | 12/1967 | King et al. | 137/411X |

Primary Examiner—M. Cary Nelson
Assistant Examiner—Robert J. Miller
Attorney—Jones & Thomas ABSTRACT: A chemical feeder for feeding a chemical from a solid chemical compound into a stream of water. The feeder includes a housing divided into upper and lower chambers, a chemical container positioned in the upper chamber for receiving a solidified chemical compound, a liquid inlet conduit communicating with the upper chamber, a liquid exhaust conduit communicating with the lower chamber, valves controlling both conduits, and a float positioned in the lower chamber for operating both valves. The chemical container includes a plurality of apertures at spaced intervals about its lower end, and a nozzle extending inwardly from its lower end for flowing liquid from the upper chamber into contact with the solidified chemical compound and eroding the compound from its lower end. The mixture of the liquid and chemical compound flows from the upper chamber to the lower chamber.

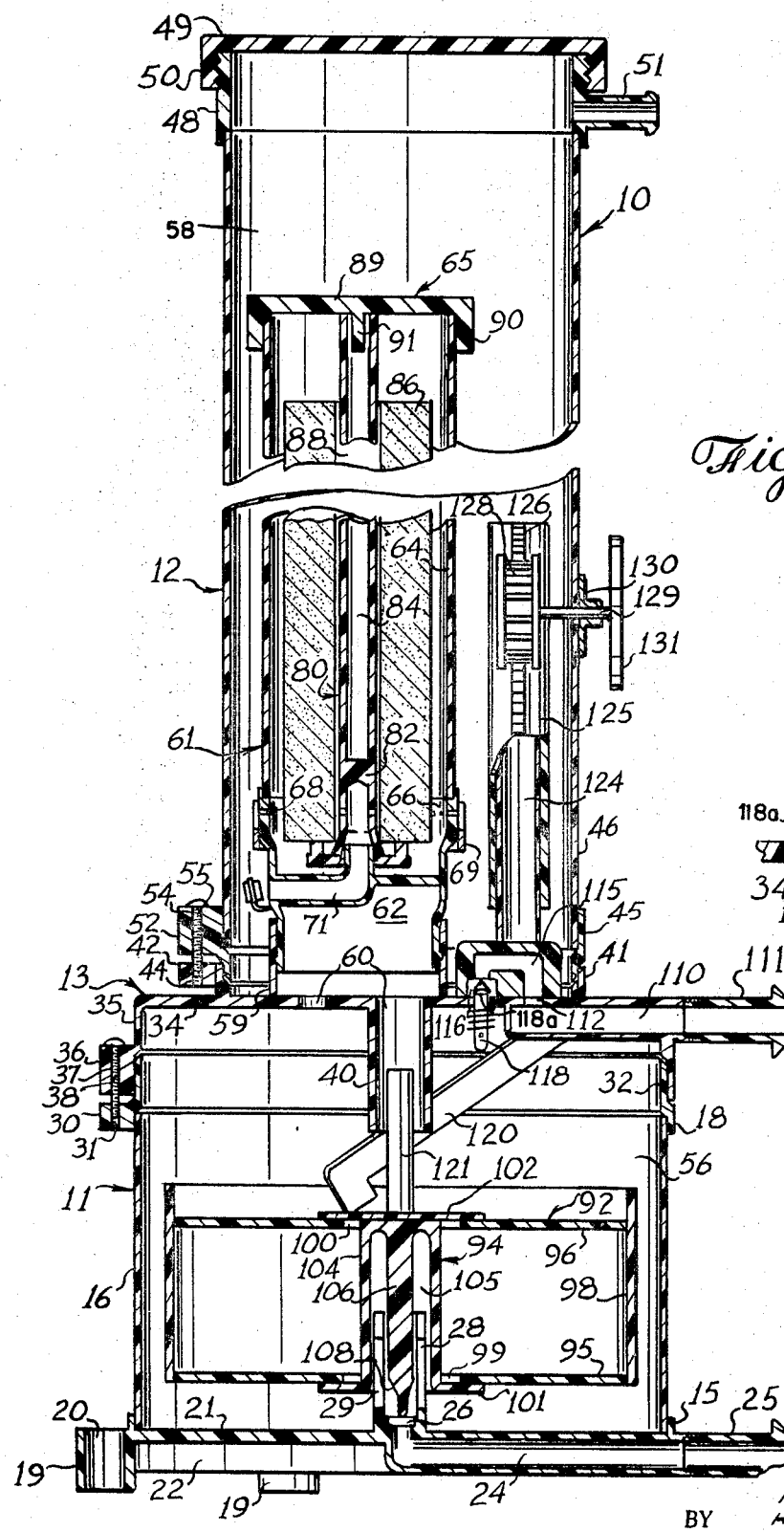

PATENTED MAY 18 1971
3,578,776
SHEET 2 OF 2
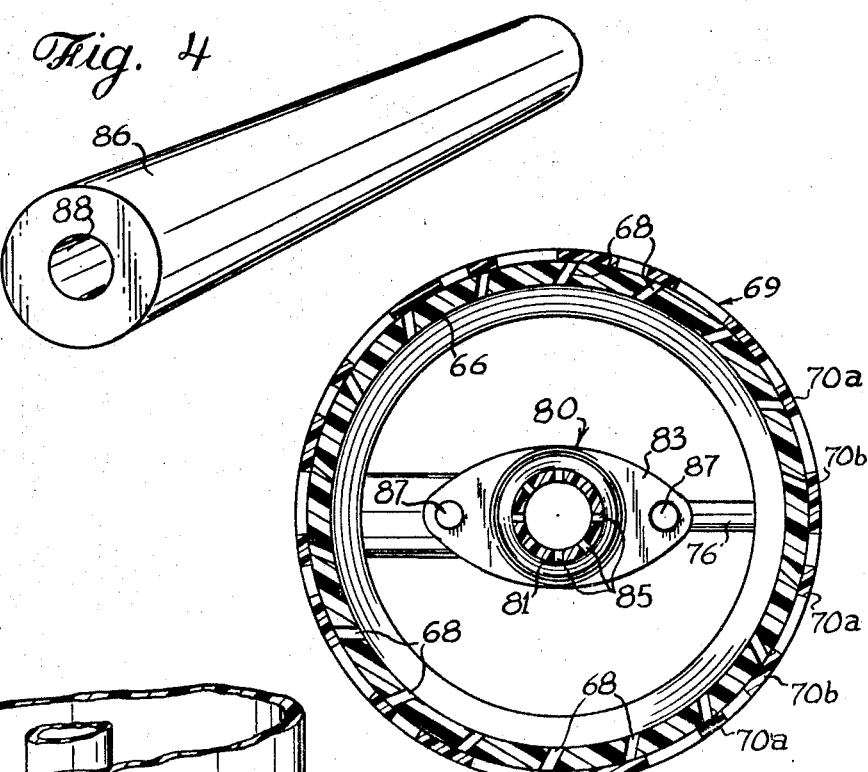
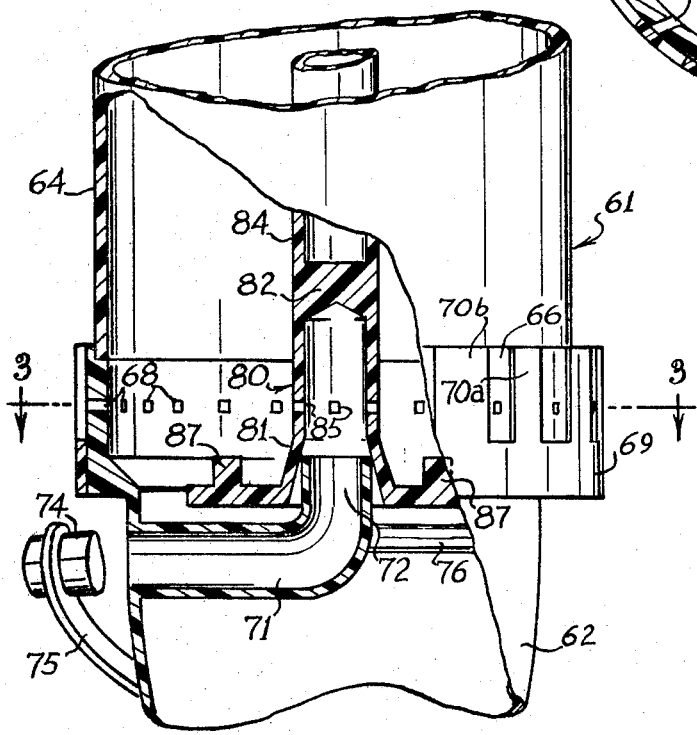
INVENTORS
THOMAS E. SCHNEIDER, JR.
MARION R. CARSTENS
BY HOMER J. BATES
Jones & Thomas
ATTORNEYS 3,578,776

CHEMICAL FEEDER

CROSS-REFERENCE TO RELATED APPLICATIONS

This application is a continuation-in-part of our application Ser. No. 579,253, filed Sept. 14, 1966, which in turn was a continuation-in-part of our application Ser. No. 403,968 filed Oct. 12, 1964.

BACKGROUND OF THE INVENTION

When mixing chemicals with liquids it usually desirable to continuously mix the chemical with the liquid at a controlled rate so that the resulting mixture is not too concentrated or otherwise improperly mixed. While this principle is involved in various applications of chemical mixing, one of the more critical applications is that of mixing chlorine with water for the purification for swimming pool water. It is well known that swimming pool water must contain a certain level of chlorine concentration in order that the water be fit for continuous bathing, and the more bathers for a given quantity of swimming pool water, the higher the chlorine concentration should be. Of course, since excessive chlorine concentration is frequently injurious to the skin and eyes of the body, extreme care must be taken to avoid placing an excessive amount of chlorine in the pool water.

Because of the importance of having the correct concentration of chlorine in pool water, it has been common practice to add the chlorine to the water by hand. While such a procedure results in fairly accurate control of the chlorine concentration at the time the chlorine is added to the water, the chlorine concentration dissipates between treatments, the chlorine is usually added to the water at one spot in the pool which results in high chlorine concentration at that spot and inadequate chlorine concentration in the rest of the pool water, and the maintenance of adequate chlorine content in the pool water by such periodic application is subject to human frailties of memory and judgment.

Previous devices have been developed for feeding chemicals into a stream of water, as shown by U.S. Pat. No. 3,323,539, and the invention disclosed herein is an improvement thereover.

SUMMARY OF THE INVENTION

Briefly described, the present invention comprises a chemical feeder for feeding a chemical into a stream of water, wherein water impinges on the bottom portion of an upright stick of solidified chemical compound and erodes the compound, and as the compound erodes it moves in a downward direction into the impinging liquid until the entire stick is dissipated. The stick is formed with a central aperture extending along its length, and the water impinges on the stick about its outer and inner perimeter, to erode the stick simultaneously from its outside and inside surfaces.

Thus, it is an object of this invention to provide a chemical feeder for mixing a chemical with a liquid, wherein the chemical is continuously mixed with the liquid at a substantially uniform rate.

Another object of this invention is to provide a chemical feeder wherein a solidified body of chemical compound is positioned in an upright position, and liquid is directed into an impinging relationship with the bottom portion of the compound so as to progressively erode the compound at its bottom surface.

Another object of this invention is to provide an improved stick or solidified body of chemical compound, which is formed in a shape particularly suitable for continuously eroding the compound at a uniform rate with a liquid, so as to mix the chemical compound with the liquid.

Another object of this invention is to provide a chemical feeder apparatus for mixing a chemical compound with a liquid, wherein the flow of liquid toward and away from the chemical compound is controlled and regulated in such a manner that the pressure of the liquid as it mixes with the compound is substantially constant, and the flow of the mixture of the liquid and the chemical away from the chemical compound is terminated when an insufficient supply of liquid is available.

Other objects, features and advantages of the present invention will become apparent upon reading the following specification, when taken in conjunction with the accompanying drawing.

BRIEF DESCRIPTION OF THE DRAWING

FIG. 1 is a vertical sectional view of the chemical feeder.

FIG. 2 is a detail showing, with parts shown in cross section, of the lower portion of the chemical compound container.

FIG. 3 is a cross-sectional view, taken along lines 3—3 of FIG. 2, of the chemical compound container.

FIG. 4 is a perspective view of the chemical stick or solidified chemical compound.

FIG. 5 is a detail showing of the valve housing and its related components.

DESCRIPTION OF THE EMBODIMENT

While the invention disclosed herein is directed to a chemical feeder for mixing chlorine with swimming pool water, it should be understood that the inventive concept may be applicable in the feeding of a wide variety of substances to various liquids, and that the concept should not be limited to the particular field disclosed.

Referring now more particularly to the drawing, in which like numerals indicate like parts throughout the several views, feeder 10 includes lower housing 11, upper housing 12 and connector 13. Lower housing 11 includes base 15, annular sidewall 16, and upper annular flange 18. While the components of lower housing 11 can be fabricated from various different materials, it is anticipated that sidewall 16 shall be of a transparent material, such as Plexiglas, so that the elements within lower housing 11 can be observed.

Base 15 of lower housing 11 includes a plurality of support legs 19 at spaced intervals about its perimeter, and each support leg 19 defines a vertical opening 20 through which connecting screws, or the like, can be inserted for supporting feeder 10. Base 15 also includes horizontal platform 21 which is spaced above the bottom of support legs 19, and which is substantially disc shaped. Flange 22 extends downwardly from the periphery of platform 21. Exhaust conduit 24 extends downwardly from the periphery of platform 21. Exhaust conduit 24 extends along the bottom surface of horizontal platform 21 through flange 22, and terminates in replaceable nipple 25 which is threaded into the end of conduit 24. The inner end of conduit 24 extends up through the central portion of horizontal platform 21, and terminates in valve seat 26 and valve guide 28. Valve guide 28 defines a plurality of vertical slots 29. Upper annular flange 18 of lower housing 11 includes a plurality of spaced bosses 30, each of which defines a threaded bore 31. The upper portion 32 of flange 18 is offset inwardly from its lower portion.

Connector 13 includes horizontal disc-shaped dividing wall 34, and downwardly extending connecting flange 35. Flange 35 is shaped to fit about the offset upper portion 32 of annular flange 18 of lower housing 11. A plurality of bosses 36 are spaced about flange 35, at intervals corresponding to the intervals between the bosses 30 of lower housing 11. Bosses 36 define openings 37, and screws 38 are inserted through the openings of bosses 36 and threaded into the bores of bosses 30, to attach connector 13 to lower housing 11.

Dividing wall 34 includes centrally located downwardly extending guide socket 40, and upwardly extending annular support flange 41. A plurality of bosses 42 are positioned at spaced intervals about support flange 41, with each flange 44 including a threaded bore 44.

Upper housing 12 includes a lower flange 45, sidewall 46, upper flange 48, and cap 49. Upper flange 48 is externally threaded, while cap 49 includes downwardly extending flange 50 which is internally threaded and threadable onto flange 48.

Flange 48 also includes overflow duct 51. Lower flange 45 includes a plurality spaced bosses 52 positioned at intervals thereabout corresponding to the intervals between bosses 44 of support flange 41, and each boss 52 defines opening 54 through which screws 55 are inserted and in engagement with the threads of bosses 42. As with lower housing 11, sidewall 46 can be fabricated of various materials; however, it is anticipated that sidewall 46 will be fabricated of a transparent material, such as Plexiglas, so that the interior portion of upper housing 12 can be observed. Thus, it will be understood at this point, that lower housing 11 and upper housing 12 define lower chamber 56 and upper chamber 58 which can be viewed from outside feeder 10.

Connector 13 includes upwardly extending container support flange 59 and a plurality of openings 60 therethrough within the confines of flange 59 which function to allow chamber 58 of upper housing 12 to communicate with chamber 56 of lower housing 11. Chemical container 61 is inserted into and supported by container support flange 59 over openings 60. Container 61 includes inwardly tapered mounting base 62, sidewall 64, and cap 65. Mounting base 52 is inserted into container support flange 59, and supports container 61 within chamber 58. Base 62 includes annular weir 66 which defines a plurality of equally spaced openings 68 placed in substantially a horizontal plane. As is shown in FIG. 3, each opening 68 extends generally tangentially inwardly of container 61 at an angle offset counterclockwise from the center of the annular weir.

As is shown in FIG. 2, control ring 69 extends around weir 66 and includes plurality of upwardly extending fingers 70a and 70b. Control ring 69 is positioned so that is fingers extends upwardly between openings 68 of weir 66, and fingers 70a are relatively narrow, while fingers 70b are relatively wide, so that the spaces between fingers 70a and 70b are alternatively narrow and wide. With this arrangement, when control ring 69 is rotated about weir 66, wide fingers 70b will cover alternate ones of openings 68 while narrow fingers 70a will not cover the openings. When control ring is rotated further, narrow finger 70a will also cover alternate ones of openings 68 so that all of the openings are covered. Of course, further rotation of control ring 69 results in uncovering all of openings 68.

Mounting base 62 includes an internal conduit 71 which opens through mounting base 62 at one of its ends, and terminates at its other end in an upwardly extending portion 72. Plug 74 is insertable into conduit 71 from outside mounting base 62, and is maintained adjacent mounting base 62 by strap 75 being attached at one of its ends to plug 74, and attached at its other end to mounting base 62. While internal conduit 71 is supported from mounting base 62 at one of its ends, the upwardly extending portion 72 thereof is supported from the opposite side of mounting base 62 by support leg 76.

Stick-positioning rod 80 extends upwardly from the internal opening of conduit 71, through out the height of chemical container 61. Rod 80 includes socket or nozzle 81 at its lower end, dam 82, and guide tube 84 which extends upwardly through a major portion of container 61. Nozzle 81 surrounds upwardly extending portion 72 of internal conduit 71, and defines a plurality of spaced openings 85. Nozzle 81 is constructed so that when it is seated on conduit 71, its openings 85 will be positioned at the level of openings 68 in weir 66. Nozzle 81 includes base or flange 83 which extends laterally of the length of positioning rod 80, and upwardly extending chemical stick supports 87 are integrally attached to the upper surface of flange 83. The upper ends of chemical stick supports 87 are positioned below the level of openings 68 of weir 66 and openings 85 of nozzle 81.

Dam 82 is positioned between nozzle 81 and guide tube 84 so as to prevent the liquid flowing through internal conduit 71 and through nozzle 81 from passing into the interior portion of guide tube 84.

A body of solidified chemical compound, such as a compound containing chlorine, is formed into a stick configuration, as is shown in FIG. 4, and stick 86 is inserted into chemical container 61. Stick 86 defines a central opening 88 which extends throughout its length, and opening 88 is inserted over guide tube 84 of stick-positioning rod 80, and chemical stick rests on upwardly extending chemical stick supports 87 of nozzle 81. After chemical stick 86 has been inserted into chemical container 61, cap 65 is inserted over the open upper end of container 61. Cap 65 comprises a disc-shaped body 89, downwardly extending peripheral flange 90, which fits about sidewall 64 of container 61, and downwardly extending central positioning knob 91 which fits into the upper end of guide tube 84.

Float 92 is positioned in chamber 56 of lower housing 11, and comprises internal stem 94, bottom wall 95, top wall 96, and peripheral wall 98. The top, peripheral and bottom walls are joined together at their edges, and bottom wall 95 and top wall 96 each include central apertures 99 and 100, respectively, which are connected to outwardly extending flanges 101 and 102 of internal stem 94. Bottom flange 101 extends outwardly from the annular wall 104 of stem 94, and annular wall 104 defines valve chamber 105. Valves stem 106 extends downwardly from flange 102 through valve chamber 105, and its lower portion 108 is of smaller thickness so it can be received in the opening of valve seat 26 of exhaust conduit 24. Valve chamber 105 is thus defined by wall 104 and valve stem 106, and is generally annular in cross section, and received valve stem guide 28 as float 92 is lowered in chamber 56. The opening of valve stem guide 28 is sufficient to receive valve stem 106.

Connector 13 includes inlet conduit 110 which extends along the bottom surface of its dividing wall 34, and the outer end of inlet conduit 110 extends through downwardly extending flange 35 and terminates in nipple 111. The inner end of conduit 110 turns upwardly and communicates with opening 112 in dividing wall 34. As is shown in FIG. 5, valve housing 114 is connected to the upper surface of dividing wall 34 and defines U-shaped duct 115 which communicates at one of its ends with opening 112 and inlet conduit 110, and at the other of its ends with slots 116 in housing 114. Slots 116 open through opposite sides of housing 114 into upper chamber 58. Valve 118 extends through an opening in dividing wall 34. The upper end or head of valve 118 is tapered to a point and projects toward duct 115, while the lower end or shank of valve 118 is rounded. 0 ring 118a extends around the head of valve 118 and functions close U-shaped duct 115. Rubber gasket 113 is positioned between valve housing 114 and dividing wall 34, and the portion of gasket 113 which surrounds the shank of valve 118 is reduced in thickness so as to be highly flexible. The opening of gasket 113 which surrounds the shank of valve 118 is smaller in diameter than the shank as that a liquid seal is established to prevent liquid from flowing around the shank of valve 118 and through dividing wall 34. Coiled compression spring 117 is positioned against the bottom surface of dividing wall 34 and extends through an opening in the shank of valve 118 and urges valve 118 in a downward direction or to its open position.

Lever arm 120 is pivotally connected at its upper end to the bottom surface of dividing wall 34 by a conventional pivot pin arrangement (not shown), and its lower end is shaped to engage flange 102 of float 92. When float 92 is lifted within lower chamber 56, lever arm 120 will ride over the surface of flange 102 and pivot about its upper end, and eventually engage valve stem 118, and urge valve stem 118 into closing relationship with U-shaped duct 115 or valve housing 114.

Guide stem 121 extends upwardly from flange 102 of float 92, and is received within guide socket 40 of connector 13. The telescoping relationships between guide stem 121 and guide socket 40, and between valve guide 28 and valve stem 106 function to retain float 92 upright within lower chamber 56, and in an operative condition.

Standpipe or overflow duct 124 extends upwardly from dividing wall 34 and into upper chamber 58. Dividing wall 34 defines an opening (not shown) at the point of connection with standpipe 124, so that standpipe 124 communicates freely with lower chamber 56. Telescoping pipe 125 surround standpipe 124 and includes rack 126 along its length. Gear 128 meshes with rack 126, and stem 129 is connected to gear 128 and extends through sidewall 46, through bearing 130. Handwheel 131 is connected to stem 129, and functions to control gear 128 from outside chamber 58. With this arrangement, handwheel 131 can be rotated to elevate telescoping pipe 125 within chamber 58, thus raising or lowering the effective height of standpipe 124.

OPERATION

When feeder 10 is to be utilized to mix a chemical with a liquid, such as chlorine with swimming pool water, the source of water for the swimming pool is connected to inlet conduit 110 of feeder 10, and exhaust conduit 24 is connected to the stream of water which is to flow into the pool. Cap 49 of upper housing 12 is removed, and cap 65 of chemical container 61 is removed. A chemical stick 86 of chlorine compound is inserted in chemical container 61 by inserting the opening 88 of chemical stick 86 about stick-positioning rod 80 until the bottom surface of chemical stick 86 rest on upwardly extending supports 78. Cap 65 is then repositioned over chemical stick 86, and cap 49 is then screwed back onto the top of upper housing 12. Handwheel 131 is then manipulated to elevate or depress telescoping pipe 125 of standpipe 124 to its proper position. Water from the source of water or from the recirculating water from the pool is then allowed to enter inlet conduit 110. The water flows through valve housing 114 and out through slots 116 into upper chamber 58. The water then begins to accumulate in upper chamber 58, and will continue to accumulate until it reaches the opening at the top of telescoping pipe 125, or until a state of equilibrium is reached within upper chamber 58. As the water rises above the level of openings 68 in weir 66, water will begin to flow through openings 68 in weir 66 and up through internal conduit 71, its nozzle 81, and nozzle openings 85. After the water passes through openings 68 and 85, it impinges upon the lower portion of chemical stick 86. As is shown in FIG. 3, the water passing through openings 68 impinges on the outer annular bottom surface of chemical stick 86 at an angle directed through a large area of the annulus of the chemical stick, while the water passing through openings 85 impinges upon the inner annular bottom surface of chemical stick 86 at an angle directed generally radially outwardly from nozzle 81. The impingement of water against chemical stick 86 erodes the stick at its bottom portion at a substantially uniform rate throughout the entire annular bottom surface of stick 86, and as stick 86 is eroded its main body portion will move downwardly within container 61 so that a new surface of chemical compound will always be present for the impingement of water.

As the level of water within upper chamber 58 rises due to the water passing through inlet conduit 110, the velocity at which water passes through openings 68 and 85 of weir 66 and nozzle 81 increases, until a state of equilibrium is reached, or until the level of water reaches the upper edge of telescoping pipe 125 and standpipe 124, and overflows into lower chamber 56. Thus, standpipe 124 and telescoping pipe 125 function to establish the upper limit of the liquid level in upper chamber 58, and thus the velocity with which the liquid will flow through openings 68 and 85.

As the mixture of water and chlorine falls from chemical stick 86, it passes through openings 60 in dividing wall 34, and into lower chamber 56. As the water accumulates in lower chamber 56, it will raise float 92 so that its valve stem 106 will be withdrawn from valve seat 26, and allow the mixture to pass through exhaust conduit 24 and to the pool. If the passage of water from upper chamber 58 to lower chamber 56 is faster than the exhaust of the mixture from lower chamber 56 through exhaust conduit 24, float 92 will continue to rise, and lever arm 120 will pivot about its upper end until it engages valve stem 118, and closes U-shaped duct 115 and inlet conduit 110. Thus, the inlet conduit will be closed until the level of liquid in lower chamber 56 is lowered, whereupon valve stem 118 is withdrawn from U-shaped duct 115. In this manner, lower chamber 56 and upper chamber 58 are prevented from flooding. Also, if the supply of water through inlet conduit 110 is not sufficient to maintain a liquid level within lower chamber 56, float 92 functions to close exhaust conduit 24. Thus, when exhaust conduit 24 is connected to the inlet of a pump, the suction of the pump will not function to draw air through the system and possibly create an air lock or vapor lock within the pump.

Control ring 69 of chemical container 61 is adjustable about weir 66 so that all of the openings 68 can remain open and water can pass through all the openings and impinge on chemical stick 86; however, when it is desired to reduce the flow into chemical container 61, as when reducing the concentration of chlorine with the pool water, control ring 69 can be rotated so that it blocks alternate ones of openings 68, thus cutting the flow through weir 66 in half. Furthermore, plug 74 can be inserted into internal conduit 71 to shut off the flow of water through nozzle 81. This further slows the erosion of chemical stick 86. Thus, the rate of erosion of chemical stick 86 and the concentration of chlorine in the pool water can be controlled by the position of control ring 69 with respect to weir 66, by inserting plug 74 in internal conduit 71, and by elevating or lowering telescoping pipe 125 of standpipe 124 to raise or lower the pressure head of the water passing through openings 68 and 85.

The arrangement of weir 66 and its control ring 69 is such that a large number of openings 68 are created in weir 66 so that a large quantity of water can be passed through weir 66. Control ring 69 is adjustable to block alternate ones of openings 68 to significantly cut down the quantity of water passing through opening 68. Furthermore, the addition of internal conduit 71 and its nozzle 81 is such that an additional quantity of water impinges upon chemical stick 86. Thus, it should be apparent that feeder 10 is useable with small swimming pools that are used only by a small number of people and require only a low chlorine concentration, and is useable with large pools used by a large number of people and which require a high chlorine concentration. By manipulating control ring 69, plug 74, and telescoping pipe 125, virtually any chlorine concentration up to a safe maximum can be obtained for substantially any quantity of water.

While the invention has been disclosed as including a single chemical container 61, it will be apparent that several containers 61 can be utilized in a single upper chamber 58 without significantly modifying the remaining elements of the invention. Furthermore, the diameter of chemical container 61 and its chemical stick 86 can be varied to accommodate larger chemical sticks 86. The number and area of openings 68 and 85 can be varied, as desired, to achieve the proper flow of water through weir 66 and nozzle 81. The size and location of inlet conduit 110 and exhaust conduit 124 can be varied as desired, as can be the various connecting bosses, float, and valve arrangement of the invention.

It will be obvious to those skilled in the art that many variations may be made in the embodiments chosen for the purpose of illustrating the present invention without departing from the scope thereof as defined by the appended claims.

We claim:

1. Chemical-eroding device for use with a soluble chemical compound, said device including a housing for the soluble chemical compound, the housing having at least one sidewall, means for directing a plurality of streams of solvent liquid through the sidewall of the housing and toward the interior of the housing, and control means positioned about the housing, said means, being constructed and arranged to selectively block at least one of the streams of liquid.

2. Chemical-eroding device of claim 1 wherein the means for directing a plurality of streams of liquid comprises a plurality of openings defined in the housing in a substantially horizontal plane, said openings extending tangentially and inwardly toward the central portion of the housing.

3. Chemical-eroding device of claim 1 wherein the interior of the housing is solid with an elongated shape and defines an opening along its length to provide an inner surface for the compound, and the device includes means for directing a plurality of streams of liquid toward the inner surface of the compound.

4. Chemical-eroding device of claim 2 wherein the means for directing a plurality of streams of liquid toward the soluble chemical compound and the means for directing a plurality of streams of liquid toward the inner surface of the compound are both constructed and arranged to direct the streams toward a lower end of the soluble chemical compound.

5. Chemical-eroding device for use with a soluble chemical compound, said device including a housing for the soluble chemical compound, a plurality of openings defined by the housing for directing a plurality of streams of solvent liquid against the soluble chemical compound, and a movable control ring positioned about the housing for the soluble chemical compound, said ring including a plurality of fingers in spaced-apart relation to one another for blocking one or more of the openings.

6. Chemical-eroding device of claim 5 wherein the fingers of the control ring are spaced apart a distance which alternates from relatively narrow to relatively wide with respect to each other.

7. Chemical-eroding device of claim 5 wherein the fingers of the control ring have alternately relatively wide and relatively narrow width with respect to each other.

8. Chemical-eroding device of claim 6 wherein the fingers of the control ring have alternately relatively wide and relatively narrow width with respect to each other.

9. Chemical-eroding device of claim 1 wherein the housing defines a plurality of openings in a substantially horizontal plane, said openings extending inwardly through the wall of the housing toward the interior of the housing.